March 16, 1937.  G. DE BOTHEZAT  2,073,833
AIR CONDITIONER
Filed Aug. 29, 1935  2 Sheets-Sheet 1

INVENTOR
George de Bothezat
BY
Edwards Bower Cool
ATTORNEYS

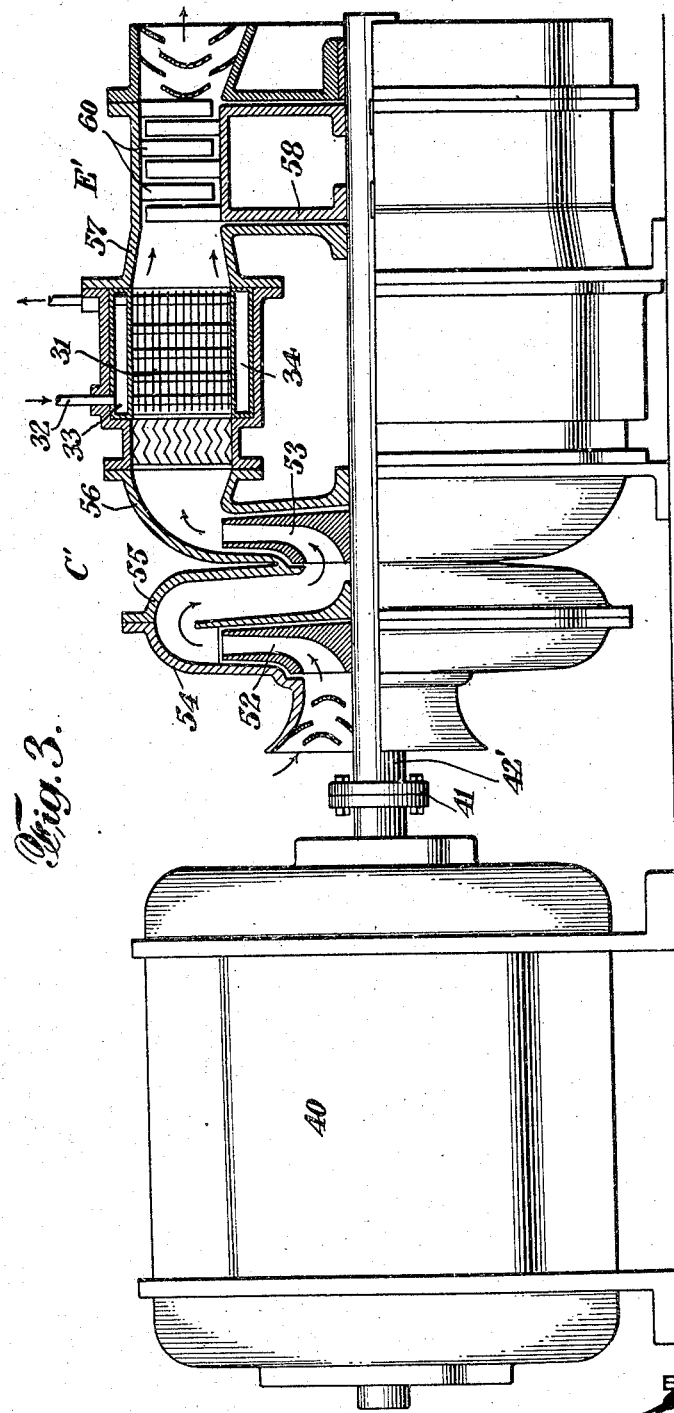

Patented Mar. 16, 1937

2,073,833

UNITED STATES PATENT OFFICE 2,073,833

AIR CONDITIONER

George de Bothezat, New York, N. Y.

Application August 29, 1935, Serial No. 38,381

4 Claims. (Cl. 62—136)

This invention relates to air-conditioning and the object of the invention is to provide a system which will be simple and inexpensive in the apparatus involved and adapted to efficiently deliver large volumes of cooled and dehumidified air.

Air-conditioning machines now on the market are of the two stage type, first cooling a special chemical refrigerant and then using this to cool the air and reduce its moisture content.

The system of this invention uses the air itself as refrigerant in a single stage and thus may omit the cooling of special chemical refrigerants while at the same time attaining improved performance in supplying large volumes of properly conditioned air at low cost.

In the accompanying drawings illustrating the system of this invention

Figure 1:
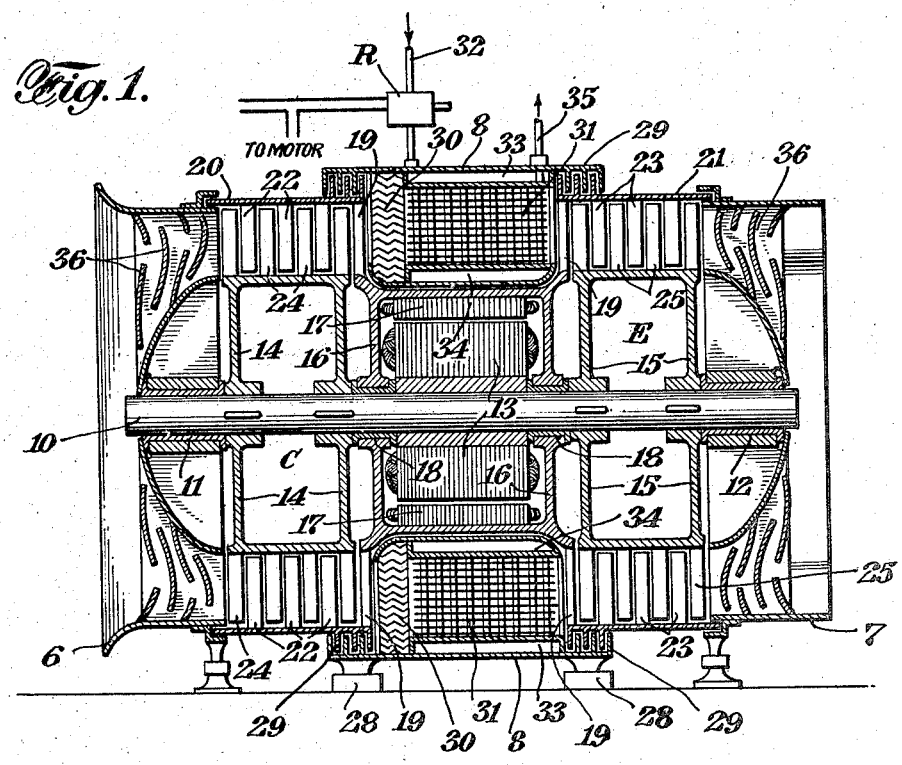
Figure 2:
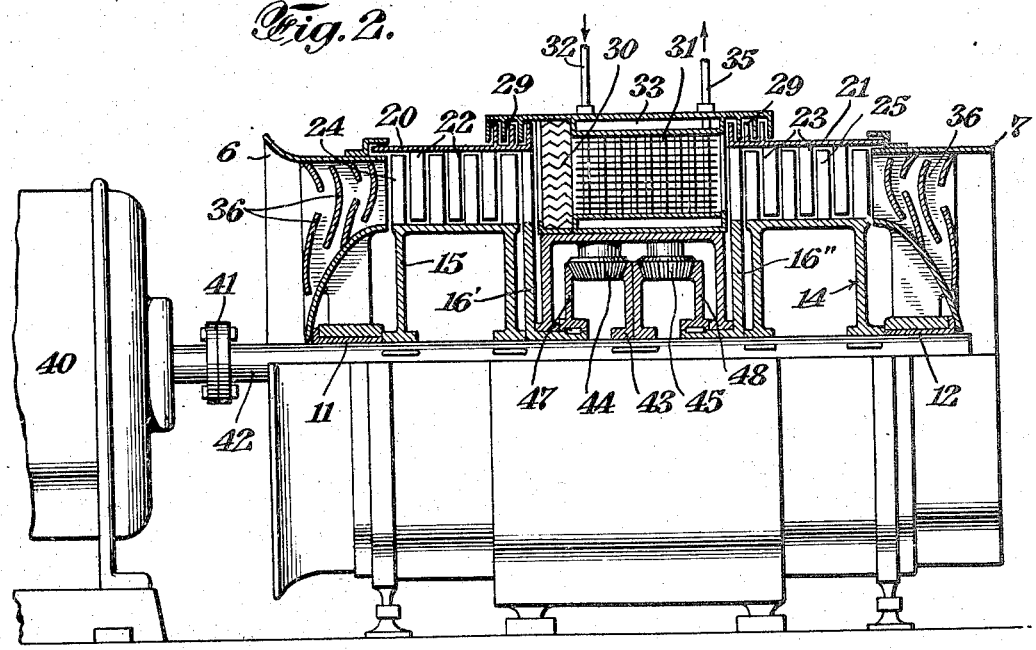

Fig. 1 is a vertical sectional view of one embodiment of apparatus made in accordance with the invention, and Figs. 2 and 3 are elevational views partly in section of modifications.

In the specific embodiment of the invention shown in Fig. 1 an intake casing 6 and an exhaust casing 7 carry central bearings 11, 12 for a shaft 10 driven by motor armature 13 and having keyed to it the rotors 14, 15 of the compressor C and air expansion motor E. The shell 16 of motor field 17 is rotatably mounted at 18, 18 on the shaft 10 so that the armature 13 and field 17 rotate oppositely at substantially equal speeds. The motor field shell 16 through vanes 19 carries the outer rotors 20, 21 of the compressor C and air motor E, and these rotors carry blades 22, 23 cooperating respectively with blades 24, 25 of the inner rotors 14, 15. The annular space between the compressor C and air motor E is enclosed by the surrounding plate housing 8 supported by pedestals 28 and provided with labyrinth seal connections 29 with the compressor and air motor rotors.

In the space around the motor are provided water separating and cooling means comprising the ring of baffles 30 and the cooler 31 which receives a supply of cold water from pipe 32 and header 33 and discharges through header 34 and pipe 35.

The air enters the system at the left through the muffler and dust eliminator formed by entrance casing 6 with its baffles 36, the paired blades of the duplex rotary compressor C creating the suction to draw in the supply and acting to progressively compress the air to a pressure of about one to five pounds per square inch above atmosphere. The compressed air then passes to the water particle eliminator 30 separating out what is still left of the water condensed during the compression and discharging through any desired drip outlet. The compressed air is then cooled by being passed through the water radiator 31 and is still under pressure above atmospheric when it leaves the cooler 31 and passes to the blading of air expansion motor E. In this motor the air expands with a progressive drop in pressure and delivers torque to the oppositely running rotors in the direction in which they are being driven by the field and armature. The air in expanding cools and is further dehumidified and passes on to final discharge through the casing 7 forming a muffler and water particle eliminator.

The duplex rotating compressor C is of the disk or impeller type described in U. S. Letters Patent No. 2,004,571 of June 11, 1935 substantially formed of cooperating pairs of fan wheels with radial blades. A pair of such wheels having a diameter of one foot and rotating at 3600 R. P. M. can be so designed and dimensioned as to produce a pressure of substantially one half pound per square inch.

The duplex rotating air motor or turbine E is similar in type to the compressor in comprising pairs of oppositely rotating blade carrying wheels. This type of compressor motor is relatively efficient in avoiding the losses incident to the use of stationary deflecting vanes and a considerable part of the power is recovered in the air motor E with corresponding reduction in the power required of the motor windings 13, 17.

The temperature differences, the amount of cooling at water radiator 31, and the particular pressures to be developed will depend upon the characteristics of the entering air and the "comfort" conditions to be attained in the space to be ventilated. Normally with the system of this invention the amount of air supplied will be increased over conventional practice which uses relatively large temperature differences and insufficient air for the ventilation attainable by the present system.

The desiderata of air conditioning and ventilation are not as commonly assumed the most comfortable temperature and relative humidity for human beings on the supposition that the conditions are lasting and permanent. The real criterion is the relief afforded under the often highly variable surrounding conditions. Given certain outside conditions of temperature and relative humidity the most desirable air-conditioning is that giving a decrease in temperature and humidity affording real relief from prevailing conditions without producing discomfort by intense coolness and dryness of the air and without shock when one has to return to the outside atmosphere. Such conditioning is supplied by the system of this invention in delivering much larger volumes of air with smaller temperature and humidity differentials and this is attained with an actual saving in the power required per ton of refrigeration.

The term "cooling effectiveness" will be used to designate the number of refrigerating tons per horsepower and as applied to the air-conditioning cycle of the present system may be calculated as follows, where "cooling effectiveness" is $e$.

$$e = \frac{Q}{AL} = \frac{1}{(p/p_0)^{(n-1)n} - 1} = \frac{1}{T/T_0 - 1}$$

where $Q$ = amount of calories available for cooling in a unit of time
$A$ = thermic equivalent of work
$L$ = power required
$p$ and $p_0$ = final and initial pressures in the compressor
$n$ = ratio of the specific heats
$T$ and $T_0$ = final and initial absolute temperatures in the compressor.

The units used are the kilogram, the meter, the second, the major calorie, the degree centigrade (R. Plank handbook "Hütte", 25th ed., vol. IV, page 434). The major calorie is very closely equal to 4 B. t. u., and the degree centigrade is equal to 9/5 of the degree Fahrenheit. The American ton of refrigeration represents a refrigerating power of 50 major calories or 200 B. t. u. per minute so that $t$ (American tons per H. P. minute) $= 0.21\ e$.

When the system receives comparatively dry air (for instance below 60% relative humidity) and compresses it to pressures less than one third atmosphere above atmospheric or below five pounds per square inch substantially no moisture condensation will take place during the compression. In such case the temperature rise during the compression will be almost equal to the temperature drop during the expansion because the theoretical thermic cycle runs between two adiabatics and two curves of constant pressure, with the same use and drop of pressure along them.

When the relative humidity of the entering air is high considerable moisture will be condensed during the compression and the liberated latent heat of this condensation will produce a temperature rise additional to the one due to the adiabatic compression. If air of relative humidity above 66% has its pressure raised one third of an atmosphere then its humidity content will be reduced, due to decrease in volume by compression, to about two thirds of the moisture which the air would contain when saturated. Then such air after compression (if only the condensed water is eliminated) will on subsequent expansion to normal temperature have a relative humidity not exceeding 66%.

This "squeezing" out of the moisture by compression is of importance because this permits the latent heat in the condensed moisture to be separated and eliminated as an incident to the inexpensive process of cooling the compressed air in the radiator 31 following the compression.

The power required to compress the same volume of air whether moist or dry is only slightly different because the moisture affects the air density very slightly and the compressive power is only slightly increased by the rise of pressure produced by the additional heating of the air by the liberated latent heat of the condensed moisture.

The system of this invention precipitates all the required moisture during the compression of the air, this constituting an important advantage in the sense of heat balance and power economy in comparison with systems using a special refrigerant to contact and dehumidify the air. In these conventional systems the whole of the latent heat of the condensed moisture, which is very high (for average conditions about 580 calories or 2320 B. t. u. per kilogram of condensed water) passes through the whole of the refrigerating cycle and the handling of this latent heat puts an objectionable extra load on the refrigerating machinery.

With the system of this invention dehumidification can be accomplished before the actual cooling cycle is reached, thus attaining greatly increased thermal effectiveness. Applying the above formulae to a hot day (35° C., 95° F. or absolute T of 308° C.) and a range of drops in temperature from 8° to 28° C. we have

| Temperature drop | $p/p_0$ | $T/T_0$ | $e$ | $t$ |
|---|---|---|---|---|
| 8° C. (14.4° F.) | 1.1 | $\frac{308}{300}=1.028$ | 35.8 | 7.5 |
| 15° C. (27° F.) | 1.2 | $\frac{308}{293}=1.05$ | 18.9 | 3.97 |
| 20° C. (36° F.) | 1.3 | $\frac{308}{288}=1.07$ | 12.83 | 2.72 |
| 28° C. (50° F.) | 1.4 | $\frac{308}{280}=1.1$ | 10 | 2.1 |

A compression of more than 0.3 above atmospheric will almost never be required. Most of the time the system will run a pressure from one to two pounds per square inch and only in rare days of extreme humidity will have to be run up to as high as five pounds per square inch.

Care should be taken to avoid running the system at pressures giving such temperature drop during the expansion cycle in the air motor E that moisture condensation takes place during this part of the cycle. This would waste the cooling effected during this expansion and reduce the effectiveness of the system. The apparatus therefore should be run so as to supply more air at smaller temperature drop and with less dehumidification. With such operation even under severest conditions, at least half of the above calculated tonnage per horsepower is obtainable in the system of this invention, or at least one ton of refrigeration per horse power. With an efficiency of the compressor and turbine of about 80% this would give a combined efficiency of 64% leaving about 14% for the additional power required for the compression due to other losses including the latent heat of moisture condensations. Most of the time the device would be operated at lower speed and lower pressure furnishing about two tons refrigeration per horsepower and only occasionally under heavy load due to higher humidity would operate at lower rates of production.

Since the pressure produced by the compressor C increases as the square of its speed apparatus normally running at two pounds per square inch pressure will only need its speed increased 50% to pass to operation under 4.5 pounds per square inch pressure.

Typical conventional air conditioning apparatus give one half ton of refrigeration per horsepower and supply only about one hundred cubic feet per minute of conditioned air for each ton of refrigeration. (Refrigerating Data Book 1932-1933, American Society of Refrigerating Engineers, chap. 20, p. 907). The system of this invention thus at least halves the cost under the heaviest operating conditions and betters this advantage at lighter loads while at the same time giving increased air supply of from two to three times the delivery of present day systems.

This improved operation is attained with a substantial simplification of the apparatus involved, attaining the air conditioning in a single stage apparatus and with a saving in size and first cost. The apparatus requires very little attention in use with only a few main bearings to be lubricated, and the absence of complicated intricate control and regulation aids in substantial reduction in the operating costs. It can be built as well for small refrigerating tonnage as for large installations, and the machine is completed and delivered in a single unit. It is not made as the conventional systems of a set of related parts put together and involving intricate connections and mechanisms likely to interrupt and spoil the entire operation. In the present system no auxiliary fans or blowers are required since the main circulation supplies all the pressure necessary for the circulation and delivery of the air into the premises or ducts to be supplied.

Substantially the entire control may be provided by simple regulation of the motor speed, higher speeds being used for higher pressures under severe conditions of heat and humidity.

The apparatus shown in the drawings is typical and may of course be widely varied within the principle of the invention. For instance as shown in Fig. 2 the rotors 14, 15, 16', 16" may be gear driven from a separate standard electric motor 40 through a coupling 41 and shaft 42. At about the center of this shaft a double bevel gear 43 is mounted driving two bevel pinions 44, 45 mounted on stub shafts carried by a gear box 46 within radiator 31 and rigidly connected to the frame of the machine. The pinions 44, 45 drive the bevel gears 47, 48 mounted on flanges of the rotors 16', 16" and loosely turning on the shaft 42. The rotors 14, 15 are keyed to the shaft 42 and rotate therewith. The rotors 14, 15 therefore rotate together in one direction while rotors 16', 16" rotate at equal and opposite speed in opposite direction, the operation being the same as that accomplished by the drive shown in Fig. 1.

In Fig. 3 illustrating a further modification the shaft 42' coupled to the motor has mounted on it a centrifugal air compressor C' and an air expansion rotor E'. The compressor has rotors 52, 53 and casings 54, 55, 56 supplied with deflecting vanes and return channels. The outer casing 57 carrying the stationary deflecting blades 60 of the turbine of the air motor E' is rigid with the radiator 31 and the rotors 52, 53, 58 rotate with the shaft 42'. The cycle of operation is substantially the same as previously described. The air is compressed by centrifugal compressor C'. The compressed air is cooled in the radiator. The compressed and water-cooled air expands in the turbine and by adiabatic expansion cools itself further below outside temperature. For an efficient operation of the device this unit should also be run so that there is no condensation of moisture taking place during the expansion cycle in the turbine.

The control of the apparatus is attained by regulation of the speed of the motor either by hand or automatically by devices responding to temperature, humidity or other conditions. A complete automatic control may be provided speeding up the motor as the temperature and humidity in the space to be air-conditioned rise, which speeding up would be stopped as soon as the moisture begins to condense in the air expansion turbine.

As indicated at R in Fig. 1 various controls may also be provided in connection with the cooling radiator 31 as to the temperature and/or amount of the circulating water. The regulating valve may for instance be connected to be electrically positioned according to the speed of the driving motor so as to increase the circulation as the motor speed rises.

The water eliminator 30 and the radiator 31 will have their passages designed to interpose little resistance to the passing of the air currents, and the blading of the air motor E will be such as to progressively drop the pressure from stage to stage to very little above atmospheric at the discharge, only slight resistance and losses being experienced in the passages between muffler vanes 36.

I claim:

1. Air-conditioning apparatus comprising an air compressor having oppositely rotating rotors, an air expansion turbine having oppositely rotating rotors, and means connecting said compressor and said turbine end to end with coaxial delivery from one to the other so that the expansion of the compressed air from said compressor will actuate said turbine to aid in driving said compressor.

2. Air-conditioning apparatus comprising an air compressor having oppositely rotating rotors, an air expansion turbine having oppositely rotating rotors, means connecting said compressor and said turbine end to end with coaxial delivery from one to the other so that the expansion of the compressed air from said compressor will actuate said turbine to aid in driving said compressor, and means between said compressor and said turbine for cooling and dehumidifying the compressed air from said compressor.

3. Air-conditioning apparatus comprising an air compressor having oppositely rotating rotors, an air expansion turbine having oppositely rotating rotors, means connecting said compressor and said turbine end to end with coaxial delivery from one to the other so that the expansion of the compressed air from said compressor will actuate said turbine to aid in driving said compressor, and means between said compressor and said turbine for cooling and dehumidifying the compressed air from said compressor so that there is substantially no further moisture condensation in said turbine.

4. Air-conditioning apparatus comprising a rotary air compressor and a rotary air expansion turbine coupled together end to end with coaxial delivery from one to the other so that the expansion of air compressed by said compressor actuates said turbine to aid in driving said compressor, and cooling means for said compressed air acting to dehumidify said air before reaching said turbine so that there is substantially no further moisture condensation in said turbine.

GEORGE DE BOTHEZAT.